United States Patent [19]

Nagai et al.

[11] Patent Number: 5,301,255
[45] Date of Patent: Apr. 5, 1994

[54] AUDIO SIGNAL SUBBAND ENCODER

[75] Inventors: Kiyotaka Nagai, Nishinomiya; Yasushi Nakajima, Osaka, both of Japan

[73] Assignee: Matsushita Electric Industrial Co., Ltd., Osaka, Japan

[21] Appl. No.: 786,798

[22] Filed: Nov. 5, 1991

[30] Foreign Application Priority Data

Nov. 9, 1990 [JP] Japan .................................. 2-305114

[51] Int. Cl.$^5$ .............................................. G10L 3/02
[52] U.S. Cl. ..................................... 395/239; 395/2.1; 395/2
[58] Field of Search ............... 381/37, 36, 31, 30, 381/29; 395/2; 358/13; 179/1; 375/30; 380/48

[56] References Cited

U.S. PATENT DOCUMENTS

| | | | |
|---|---|---|---|
| 4,291,405 | 9/1981 | Jayant et al. | 179/1 |
| 4,385,393 | 5/1983 | Chaure et al. | 375/30 |
| 4,622,680 | 11/1986 | Zinser | 381/31 |
| 4,703,480 | 10/1987 | Westall et al. | 381/30 |
| 4,805,193 | 2/1989 | McLaughlin et al. | 381/29 |
| 4,817,146 | 3/1989 | Szczutkowski et al. | 380/48 |
| 4,896,362 | 1/1990 | Veldhuis et al. | 381/37 |
| 4,935,963 | 6/1990 | Jain | 381/31 |
| 4,942,607 | 7/1990 | Schröder et al. | 381/31 |
| 4,964,166 | 10/1990 | Wilson | 381/36 |
| 4,972,484 | 11/1990 | Theile et al. | 381/37 |
| 4,982,283 | 1/1991 | Acampora | 358/133 |
| 4,987,480 | 1/1991 | Lippman et al. | 358/13 |
| 5,054,073 | 10/1991 | Yazu | 381/31 |
| 5,054,075 | 10/1991 | Hong et al. | 381/31 |
| 5,068,899 | 11/1991 | Ellis et al. | 381/31 |
| 5,105,463 | 4/1992 | Veldhuis et al. | 381/37 |
| 5,142,656 | 8/1992 | Fielder et al. | 381/37 |
| 5,161,210 | 11/1992 | Druyvesteyn et al. | 395/2 |

OTHER PUBLICATIONS

Dr. Eberhard Zwicker, "Psychoakustik", Lehrstuhl fur Elektroakustik Technische Universitat Munchen Arcisstrasse 21, D-8000 Munchen 2, copyright 1982.

Gerard C. P. Lokhoff "dcc-Digital Compact Cassette" IEEE Transactions on Consumer Electronics, vol. 37, No. 3, Aug. 1991, pp. 702-706.

N. S. Jayant, et al, *Digital Coding of Waveforms, Principles and Applications to Speech and Video*, Prentice-Hall, Inc., Englewood Cliffs, New Jersey, 1984, pp. 486-509.

G. Theile, et al, "Low bit-rate coding of high-quality audio signals An introduction to the MASCAM system," EBU Review-Technical, No. 230, pp. 71-94, Aug. 1988.

R. N. J. Veldhuis, et al, "Subband Coding of Digital Audio Signals," Phillips Journal of Research, vol. 44, Nos. 2/3, pp. 329-343, 1989.

*Primary Examiner*—Michael R. Fleming
*Assistant Examiner*—Tariq R. Hafiz
*Attorney, Agent, or Firm*—Stevens, Davis, Miller & Mosher

[57] ABSTRACT

There is provided an audio signal subband encoder which attains improved quality of sound by controlling allocation of the number of quantization bits to subband signals on the basis of an evaluation function combining the noise-to-mask ratio criterion with noise-to-signal ratio criterion in order to lessen the influence of the application error of the auditory masking rule such as the aliasing distortion of subband filters.

11 Claims, 8 Drawing Sheets

AUDIO SIGNAL SUBBAND ENCODER

BACKGROUND OF THE INVENTION

1. Field of the Invention

The present invention relates to an audio signal subband encoder used for low bit rate coding in recording/reproducing systems such as tapes and disks and transmission systems such as communication and broadcast.

2. Description of the Prior Art

In recent years, audio signal subband encoders have attracted public attention as apparatuses realizing low bit rate coding of high-quality audio signals.

Audio signal subband encoders of the prior art are described in a paper (hereafter referred to as paper 1) written by G. Theile et al., presented in EBU Review Technical, No. 230, pp. 71–94, August 1988, and entitled "Low bit-rate coding of high-quality audio signals, an introduction to MASCAM system" and a paper (hereafter referred to as paper 2) written by R. N. J. Veldhuis et al., presented in Philips Journal of Research, Vol. 44, No. 2/3, pp. 329–343, 1989, and entitled "Subband coding of digital audio signals", for example.

Audio signal subband encoders and their decoders of the prior art will hereafter be described by referring to drawings.

Figure 1:
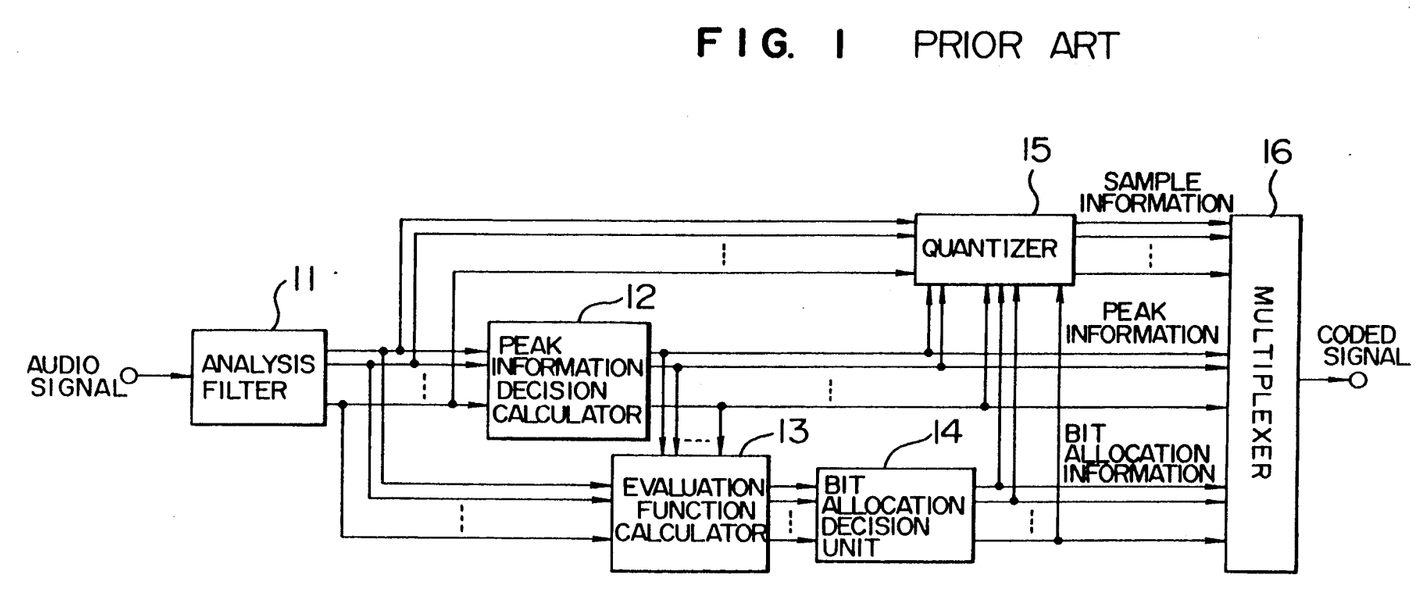
FIG. 1 is a block diagram showing the configuration of an audio signal subband encoder of the prior art.

FIG. 1 shows a block diagram of an audio signal subband encoder of the prior art.

With reference to FIG. 1, numeral 11 denotes an analysis filter, 12 a peak information decision unit, 13 an evaluation function calculator, 14 a bit allocation decision unit, 15 a quantizer, and 16 a multiplexer.

Operation of the audio signal subband encoder configured as heretofore described will hereafter be described.

In FIG. 1, the analysis filter 11 is a filter bank including a plurality of band pass filters for dividing an inputted digital audio signal into a plurality of subbands. The analysis filter 11 includes an integer-band filter bank. Integer-band filter banks are described in Chapter 11 (hereafter referred to as paper 3) of a book written by N. S. Jayant and P. Noll, published in 1984 by Prentice-Hall, and entitled "Digital coding of waveforms". In the integer-band filter bank, the ratio of the entire bandwidth to the bandwidth of a subband is an integer and decimation is performed with this ratio to downsample and convert a band pass signal to a low pass signal. At band boundaries, however, aliasing distortion is caused by the decimation. As filters capable of cancelling this aliasing distortion by using synthesis filters, quadrature mirror filters (hereafter referred to as QMFs) are widely used. QMFs are filters capable of cancelling aliasing distortion when quantization step sizes of the signals in adjacent subbands are equal. In the analysis filter 11, the signal divided into a plurality of subbands are partitioned into frames having predetermined times.

The peak information decision unit 12 derives the peak of the absolute values of signals into frames for every subband supplied from the analysis filter 11 and outputs peak information.

On the basis of the human auditory masking rule, the evaluation function calculator 13 calculates an evaluation function required for performing appropriate bit allocation in the bit allocation decision unit 14. That is to say, letting the number of subbands be N, subband No. be i (where Nos. are assigned in order from a low frequency to a high frequency, $1 \leq i \leq N$), peak information of a subband No. i be $P_i$, signal power of the subband No. i be $S_i$, threshold of power of the subband No. i masked by the signal (hereafter referred to as masked power) be $M_i$, the number of samples of the subband No. i signal in one frame be $L_i$, the number of quantization bits of a sample be $b_i$, and the number of all bits allocatable to sample information in one frame be $B_q$, quantization noise power of subband No. i is derived by the following expression.

$$(2P_i/2^{b_i})^2/12$$

Therefore, the ratio of quantization noise power of the entire band to masked power (hereafter referred to as noise-to-mask ratio) is given by the following expression.

$$\sum_{i=1}^{N} (2P_i/2^{b_i})^2/(12M_i)$$

The bit allocation decision unit 14 performs such bit allocation so as to minimize the noise-to-mask ratio under the condition expressed by the following equation.

$$\sum_{i=1}^{N} L_i b_i = B_q$$

In order to perform bit allocation in the stated way, the evaluation function calculator 13 makes a calculation of the following equation as an evaluation function $E_i$ of subband No. i.

$$E_i = \log_2(P_i/M_i^{\frac{1}{2}})$$
$$= \log_2 P_i - (\log_2 M_i)/2$$

Figure 2:
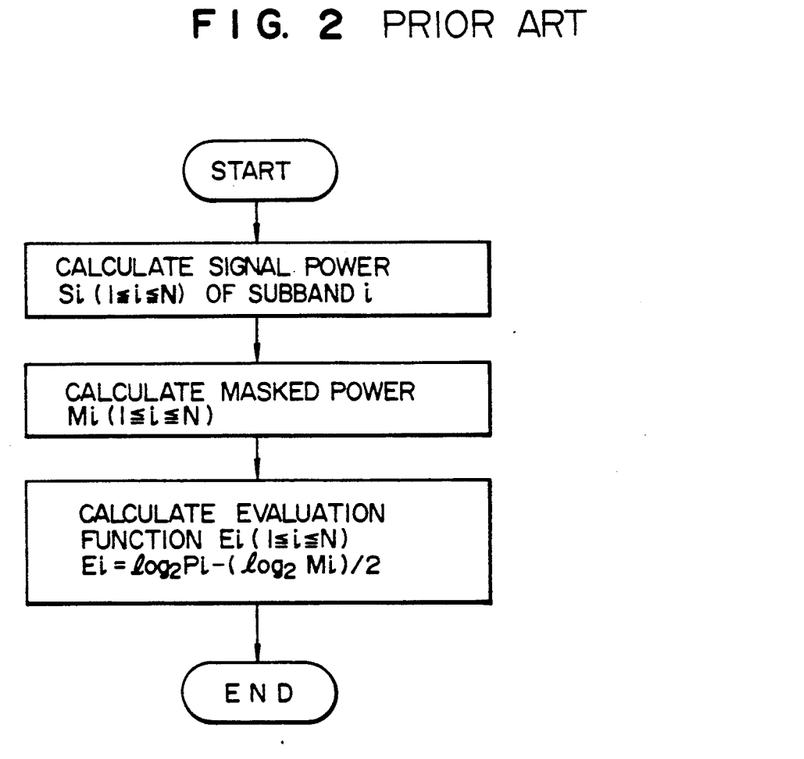
FIG. 2 is a flow chart of an evaluation function calculator of the prior art.

FIG. 2 is a flow chart of an evaluation function calculator 13 of the prior art. In the evaluation function calculator 13, signal power in each subband is first calculated by using the signal of each subband supplied from the analysis filter 11. On the basis of the signal power of each subband and the masking rule, masked power which is masked by the signal in the subband itself and the signal in adjacent subbands and hence which is not audible to human ears, is then calculated. The evaluation function is then derived and outputted by subtracting half of the logarithm of the masked power to the base 2 from the logarithm of the peak information supplied from the peak information decision unit 12 to the base 2.

Figure 3:
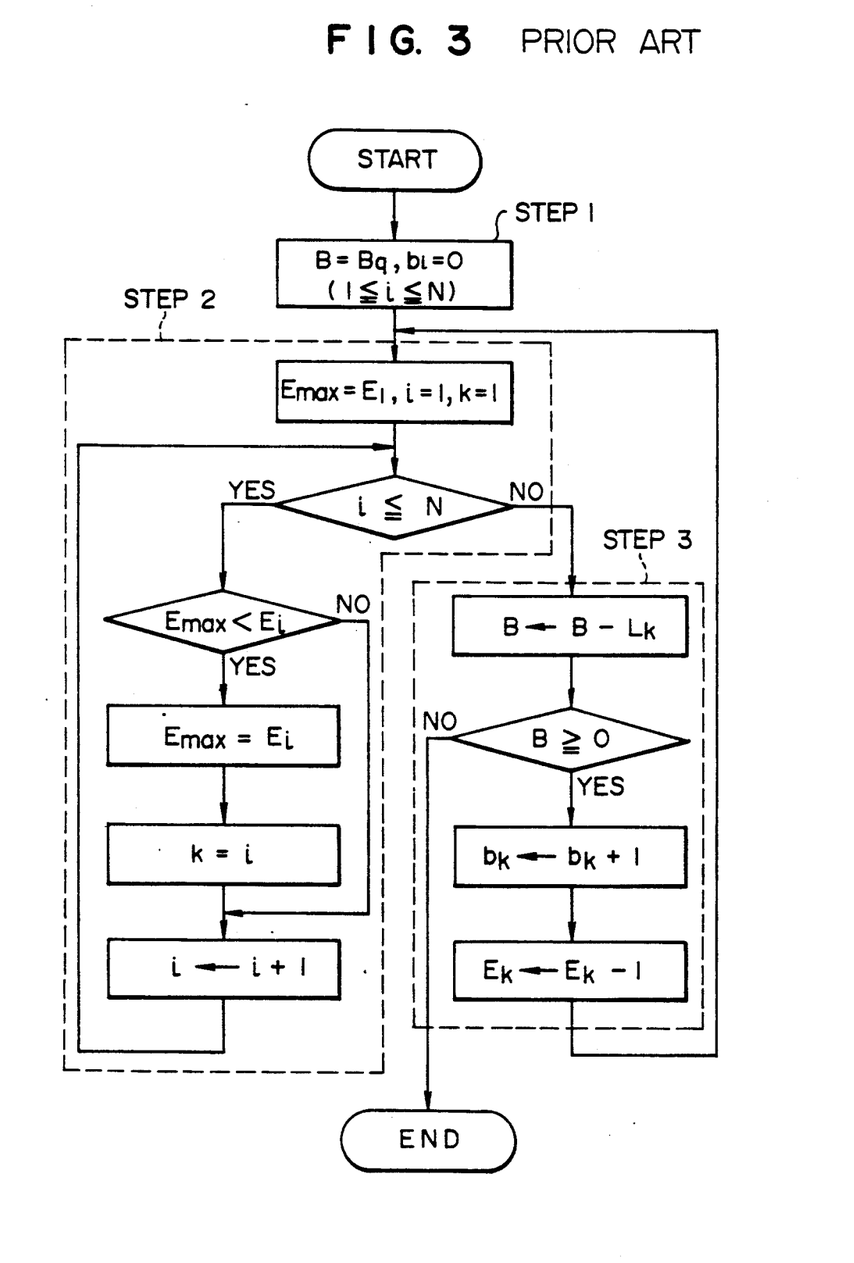
FIG. 3 is a flow chart of a bit allocation decision unit of the prior art.

FIG. 3 is a flow chart of the bit allocation decision unit 14 of the prior art. The bit allocation decision unit 14 performs initialization processing at step 1 and thereafter repeats steps 2 and 3. Thereby the bit allocation decision unit 14 decides on and outputs the number bi of bits allocated to the subband No. i which minimizes the noise-to-mask ratio.

At step 1, the number B of remaining allocatable bits is set at $B_q$ and bi ($1 \leq i \leq N$) is set at 0.

At Step 2, the subband No. k which makes the evaluation function $E_i$ the maximum value $E_{max}$ is found.

At Step 3, $L_k$ is substrated from the number B of remaining allocatable bits. If B is greater than or equal to 0, then the number $b_k$ of bits allocated to this subband is increased by one, one is subtracted from the evaluation function $E_k$, and thereafter the processing returns to the step 2. If B is negative, then the bit allocation processing is finished, and the number bi of bits at the time of finish is outputted as bit allocation information.

The quantizer 15 normalizes the signal of each frame of each subband supplied from the analysis filter 11 by using the peak information supplied from the peak information decision unit 12, quantizes the signal of each subband in accordance with bit allocation information supplied from the bit allocation decision unit 14, and outputs the result as sample information.

The multiplexer 16 multiplexes the sample information of each subband supplied from the quantizer 15, the peak information of each subband supplied from the peak information decision unit 12, and the bit allocation information of each subband supplied from the bit allocation decision unit 14. The multiplexer 16 thus outputs a coded signal.

Figure 4:
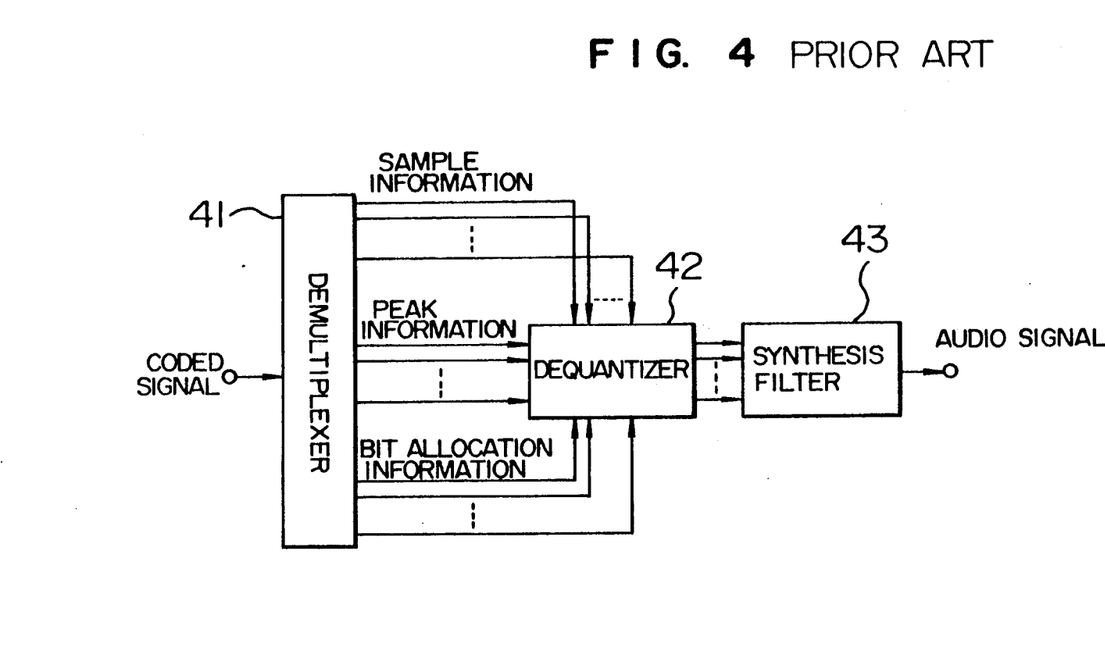
FIG. 4 is a block diagram showing the configuration of an audio signal subband decoder of the prior art.

FIG. 4 shows a block diagram of an audio signal subband decoder of the prior art for decoding signals encoded by the audio signal subband encoder.

With reference to FIG. 4, numeral 41 denotes a demultiplexer, 42 a dequantizer, and 43 a synthesis filter.

Operation of the audio signal subband decoder configured as heretofore described will hereafter be described.

In FIG. 4, the demultiplexer 41 separates the inputted coded signal into respective frames, separates the signal of each frame into sample information, peak information and bit allocation information, and outputs them. For each subband, the dequantizer 42 dequantizes the sample information supplied from the demultiplexer 41 by using the bit allocation information, then performs denormalization using the peak information, and reproduces the signal of each frame of each subband. The synthesis filter 43 upsamples the signal of each subband supplied from the dequantizer 42 up to the original sample frequency by inserting 0es into the signal and performing interpolation, and reproduces and outputs a digital audio signal by adding signals passed through a synthesis band pass filter bank paired with the analysis filter bank. Therefore, the aliasing distortion of the reproduced digital audio signal is superpositioned of characteristics of two subband filters, i.e., the analysis filter and the synthesis filter.

In the above described audio signal subband encoder of the prior art, however, an error was caused in masked power by an approximation error in applying the masking rule and bit allocation was performed on the basis of an evaluation function including the error. Therefore, the audio signal subband encoder had a problem of degraded quality of audio signals. That is to say, the effect of the aliasing distortion generated by subband filters at the time of application of the masking rule was not considered in the audio signal subband encoder of the prior art. Therefore, unmasked noises due to aliasing distortion were caused especially in low frequency subbands having small masking effects, resulting in degraded quality of sound in some cases. Further, there was also an error caused by applying the masking rule based upon a sine wave signal and a narrow band noise signal to an actual signal having complicated frequency spectra. Further, when the bit rate was increased in order to improve the transparency with respect to the original signal, bit allocation was not optimum due to the influence of the above described errors and hence a difference from the original signal remained, resulting in a problem.

SUMMARY OF THE INVENTION

An object of the present invention is to provide an audio signal subband encoder improved in quality of audio signals by decreasing the error at the time of application of the masking rule such as the aliasing distortion of subband filters and attempting the optimization of bit allocation.

In order to achieve the above described object, an audio signal subband encoder includes an analysis filter for dividing an audio signal into a plurality of subbands and dividing a signal of each subband into frames each having a predetermined time, a peak information decision unit for deciding on and outputting peak information representing peak of absolute values of a signal in the above described frames for every subband, a weighting evaluation function calculator for calculating and outputting a weighting evaluation function by subtracting a product of a logarithm of a square root of masked power of each subband and a weighting coefficient from a logarithm of the peak information supplied from the above described peak information decision unit for every subband, a bit allocation decision unit for deciding on the number of bits to be allocated to each subband by using the weighting evaluation function supplied from the above described weighting evaluation function calculator and for outputting bit allocation information, and a quantizer for quantizing the subband signal supplied from the above described analysis filter on the basis of the peak information supplied from the above described peak information decision unit and the bit allocation information supplied from the above described bit allocation decision unit and for outputting sample information for every subband.

Further, an audio signal subband encoder according to the present invention includes an analysis filter for dividing an audio signal into a plurality of subbands and dividing a signal of each subband into frames each having a predetermined time, a peak information decision unit for deciding on and outputting peak information representing peak of absolute values of a signal in the above described frames for every subband, a weighting evaluation function calculator for calculating and outputting a plurality of weighting evaluation functions by subtracting a product of a logarithm of a square root of masked power of each subband and a plurality of weighting coefficients from a logarithm of the peak information supplied from the above described peak information decision unit for every subband, a bit allocation decision unit for deciding on the number of bits to be allocated to each subband by selectively using the above described plurality of weighting evaluation functions in response to the number of bits already allocated and for outputting bit allocation information, and a quantizer for quantizing the subband signal supplied from the above described analysis filter on the basis of the peak information supplied from the above described peak information decision unit and the bit allocation information supplied from the above described bit allocation decision unit and for outputting sample information for every subband.

In the above described configuration of the present invention, there is used the weighting evaluation function capable of changing contribution of the noise-to-mask ratio representing the masking effect and the noise-to-signal ratio representing the signal waveform distortion to bit allocation by means of the value of the weighting coefficient. Thereby the weighting coefficient is set for each subband so as to make the contribution of the noise-to-signal ratio dominant in a subband where the masking effect is slight and the influence of the aliasing distortion is great and make the contribution of the noise-to-mask ratio dominant in a subband where the masking effect is great and the influence of the aliasing distortion is slight. In the weighting evaluation function calculator, the weighting evaluation function is calculated by using the above described weighting coefficient. In the bit allocation decision unit, the number of bits allocated to each subband is decided by using the above described weighting evaluation function. As a result, better bit allocation is performed. It is thus possible to lessen the influence of the aliasing distortion and improve the quality of audio signals.

Further, in the above described configuration of the present invention, a plurality of weighting evaluation functions are calculated in the weighting evaluation function calculator. In the bit allocation decision unit, the above described plural weighting evaluation functions are selected and used in accordance with the number of bits already allocated and thereby the number of bits to be allocated to each subband is finally decided. On the basis of the ratio of the quantization noise to mask ratio for the number of bits already allocated, the weighting evaluation function is thus selected out of weighting evaluation functions changed in contribution of the noise-to-mask ratio and noise-to-signal ratio to bit allocation. When the number of already allocated bits is small, bits are efficiently compressed by using the masking effect represented by the noise-to-mask ratio. When the number of already allocated bits becomes large and the noise-to-mask ratio becomes smaller than a threshold, bits are allocated to decrease the signal waveform distortion on the basis of the noise-to-signal ratio. Thereby better bit allocation is performed, and the influence of the error at the time of application of the masking rule is lessened. It is thus possible to improve the quality of a reproduced signal, and especially the difference between it and the original signal, i.e., transparency.

DESCRIPTION OF THE PREFERRED EMBODIMENTS

Figure 5:
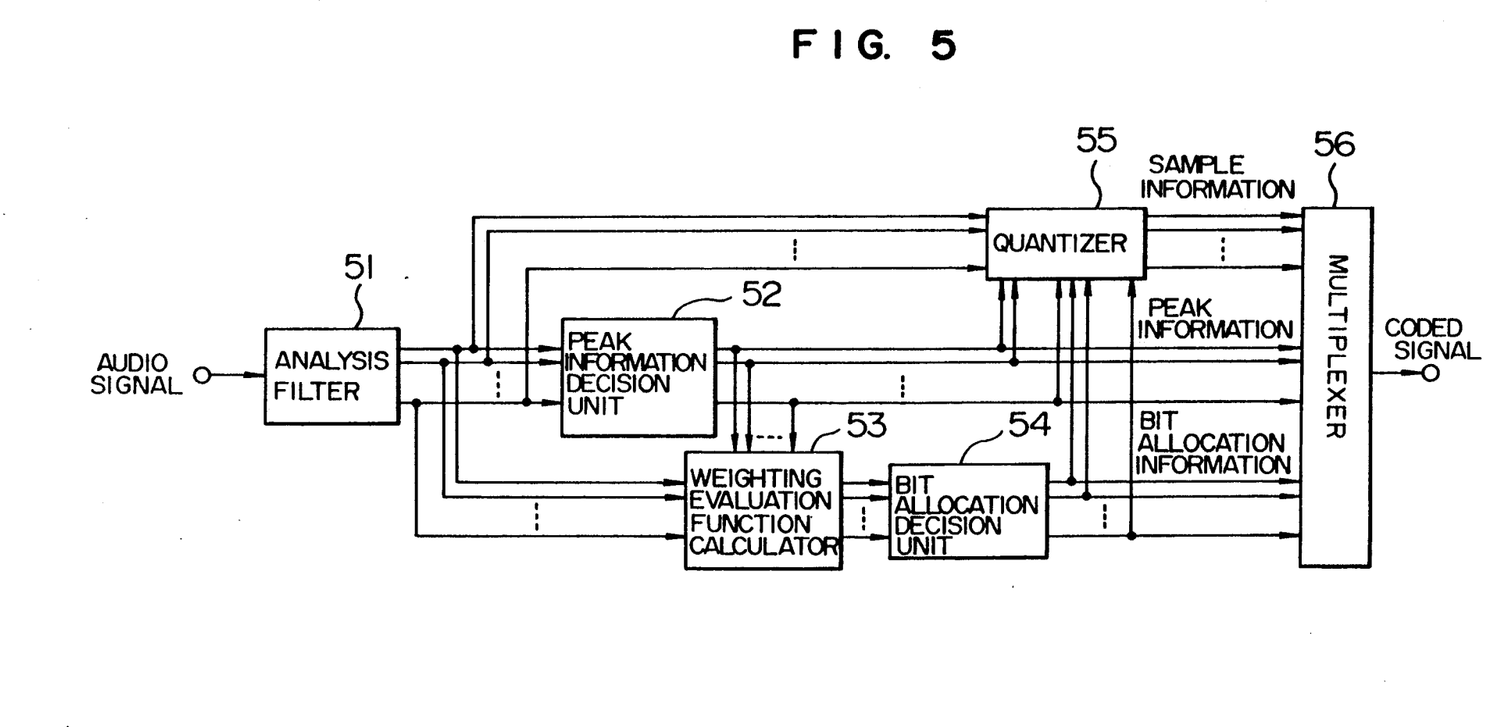
FIG. 5 is a block diagram showing the configuration of an audio signal subband encoder in an embodiment of the present invention.

FIG. 5 shows a block diagram of an audio signal subband encoder in an embodiment of the present invention.

In FIG. 5, numeral 51 denotes an analysis filter, 52 a peak information decision unit, 53 a weighting evaluation function calculator, 54 a bit allocation decision unit, 55 a quantizer, and 56 a multiplexer.

Operation of the audio signal subband encoder configured as heretofore described will hereafter be described.

The same audio signal subband decoder as that of the prior art can be used in the present embodiment. In FIG. 5 showing the block diagram of the embodiment of the present invention, numerals 51, 52, 55 and 56 denote the same components as 11, 12, 15 and 16 of the prior art shown in FIG. 1, respectively.

Operation of two embodiments of the present invention will hereafter be described. The two embodiments have the same block diagram of FIG. 5, but differ from each other in the operation of a weighting evaluation function calculator 53 and a bit allocation decision unit 54.

First of all, operation of a first embodiment will now be described by referring to the drawing.

With reference to FIG. 5, an analysis filter 51 is a filter bank including a plurality of band pass filters for dividing an inputted digital audio signal into a plurality of subbands. In case of the sampling frequency of the digital audio signal ranges from 32 kHz to 48 kHz, the digital audio signal is so divided into 16 to 32 subbands as to correspond to the critical bandwidth of human auditory characteristics, for example. The analysis filter 51 is a digital filter and it can be formed by QMFs having a tree structure. The signal divided into a plurality of subbands by the analysis filter 51 is portioned into frames each having a predetermined time ranging from 5 ms to 20 ms, for example.

A peak information decision unit 52 derives the peak of the absolute values of the signal in frames supplied from the analysis filter 51 for every subband and outputs peak information. As the peak information, a result obtained by exercising logarithmic quantization with 6 bits over the peak, for example, is used.

A weighting evaluation function calculator 53 calculates a weighting evaluation function required for performing optimum bit allocation in a bit allocation decision unit 54.

Figure 6:
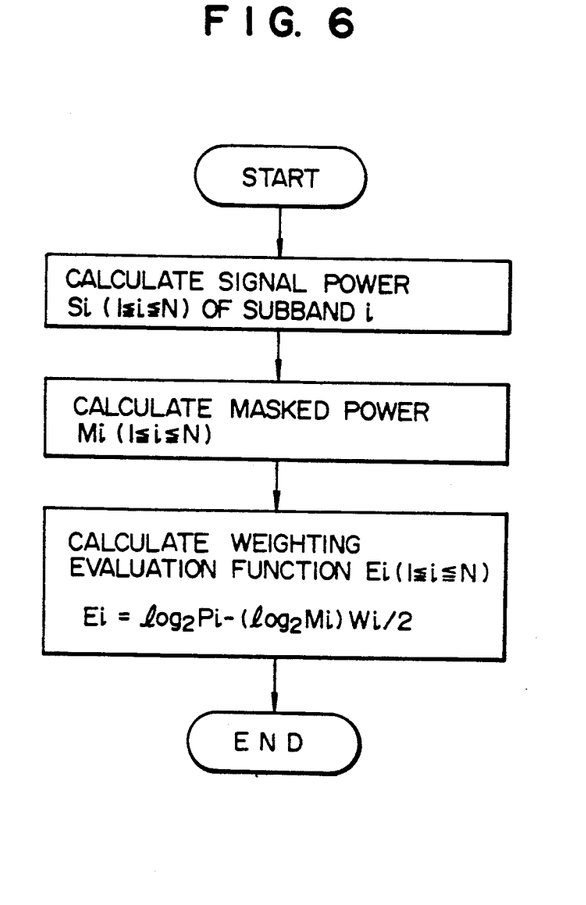
FIG. 6 is a flow chart of a weighting evaluation function calculator in a first embodiment of the present invention.

FIG. 6 is a flow chart of the weighting evaluation function calculator 53 in the first embodiment. Meaning of variables in the present embodiment is the same as that of the prior art. In the weighting evaluation function calculator 53, signal power $S_i$ of a subband No. i is first calculated by using the signal of each subband supplied from the analysis filter 51. On the basis of the signal power of each subband and the masking rule, masked power $M_i$, which is masked by the signal in the subband itself and the signal in adjacent subbands and hence which is not audible to human ears, is then calculated. As the method for calculating the masked power, the method described in pp. 334–338 of the paper 2, for example, is used. A weighting evaluation function $E_i$ given by the following equation is then calculated for every subband.

$$E_i = \log_2(P_i/M_i W_i/2)$$
$$= \log_2 P_i - (\log_2 M_i) W_i/2$$

That is to say, the weighting evaluation function $E_i$ of subband No. i is then derived and outputted by subtracting the product of the logarithm of the masked power to the base 2 and half of the weighting coefficient $W_i$ from the logarithm of the peak information $P_i$ supplied from the peak information decision unit 52 to the base 2.

The meaning of the weighting evaluation function $E_i$ will now be described. When the weighting coefficient $W_i$ is 0, the following relation is obtained.

$$E_i = \log_2 P_i$$

This is an evaluation function for minimizing the quantization noise power of the entire band given by the following equation, i.e., for minimizing the noise-to-signal ratio or the signal waveform distortion.

$$\sum_{i=1}^{N} (2P_i/2^{b_i})^2/12$$

On the other hand, when the weighting coefficient $W_i$ is 1, the following equation is obtained.

$$E_i = \log_2 P_i - (\log_2 M_i)/2$$

This coincides with the evaluation function given in the description of the prior art. That is to say, the weighting evaluation function becomes the evaluation function for minimizing the noise-to-mask ratio representing the masking effect. As heretofore described, the weighting evaluation function is an evaluation function capable of changing the contribution of the noise-to-mask ratio and the noise-to-signal ratio to bit allocation by means of the value of the weighting coefficient $W_i$.

In the evaluation function calculator 53 of the first embodiment, a weighting coefficient is set and a weighting evaluation function is calculated for every subband on the basis of the aliasing distortion characteristics of subband filters and auditory masking characteristics. That is to say, the influence of the aliasing distortion can be lessened by so setting a weighting coefficient for every subband that the contribution to bit allocation of the signal waveform distortion represented by noise-to-signal ratio may become great in a subband where the masking effect is slight and the influence of the aliasing distortion is great. In general, in subbands of low frequencies of an analysis filter and a synthesis filter, the bandwidth becomes larger than the critical bandwidth and the masking effect becomes slight because of restrictions on the implementation. In these subbands of low frequencies, therefore, the influence of the aliasing noise can be lessened by setting the value of the weighting coefficient at a small value.

The bit allocation decision unit 54 perform the same operation as that of the prior art. That is to say, the flow chart of the bit allocation decision unit 54 is shown in FIG. 3. The bit allocation decision unit 54 performs initialization processing at step 1 and thereafter repeats steps 2 and 3 by using the weighting evaluation function $E_i$. Thereby the bit allocation decision unit 54 decides on and outputs the number $b_i$ of bits allocated to the quantization of the subband No. i.

At step 1, the number B of remaining allocatable bits is set at $B_q$ and $b_i$ ($1 \leq i \leq N$) is set at 0.

At step 2, the subband No. k which makes the weighting evaluation function $E_i$ the maximum value $E_{max}$ is found.

At step 3, $L_k$ is substrated from the number B of remaining allocatable bits. If B is greater than or equal to 0, then the number $b_k$ of bits allocated to this subband is increased by one, one is subtracted from the weighting evaluation function $E_k$, and thereafter the processing returns to the step 2. If B is negative, then the bit allocation processing is finished, and the number $b_i$ of bits at the time of finish is outputted as bit allocation information.

The quantizer 55 normalizes the signal of each frame of each subband supplied from the analysis filter 51 by using the peak information supplied from the peak information decision unit 52, quantizes the signal of each subband in accordance with bit allocation information supplied from the bit allocation decision unit 54, and outputs the result as sample information. The multiplexer 56 multiplexes the sample information of each subband supplied from the quantizer 55, the peak information of each subband supplied from the peak information decision unit 52, and the bit allocation information of each subband supplied from the bit allocation decision unit 54. The multiplexer 56 thus outputs a coded signal.

The peak information decision unit 52, the weighting evaluation function calculator 53, the bit allocation decision unit 54, the quantizer 55 and the multiplexer 56 can be formed by a microprocessor.

In accordance with the first embodiment as heretofore described, there are provided the weighting evaluation function calculator for calculating the weighting evaluation function capable of changing the contribution of the noise-to-mask ratio and noise-to-signal ratio to bit allocation by means of the value of the weighting coefficient, and the bit allocation decision unit for deciding on the number of bits to be allocated to each subband by using the weighting evaluation function supplied from the weighting evaluation function calculator. By thus setting a weighting coefficient for every subband on the basis of the aliasing distortion characteristics of subband filters and auditory masking characteristics, it is possible to perform better bit allocation and lessen the influence of the aliasing distortion, resulting in improved quality of audio signals.

Operation of a second embodiment of the present invention will now be described by referring to drawing.

In the second embodiment, operation of the analysis filter 51, the peak information decision unit 52, the quantizer 55 and the multiplexer 56 is the same as that of the first embodiment and its description will be omitted. Operation of the weighting evaluation function calculator 53 and the bit allocation decision unit 54 which differs from that of the first embodiment will hereafter be described.

Figure 7:
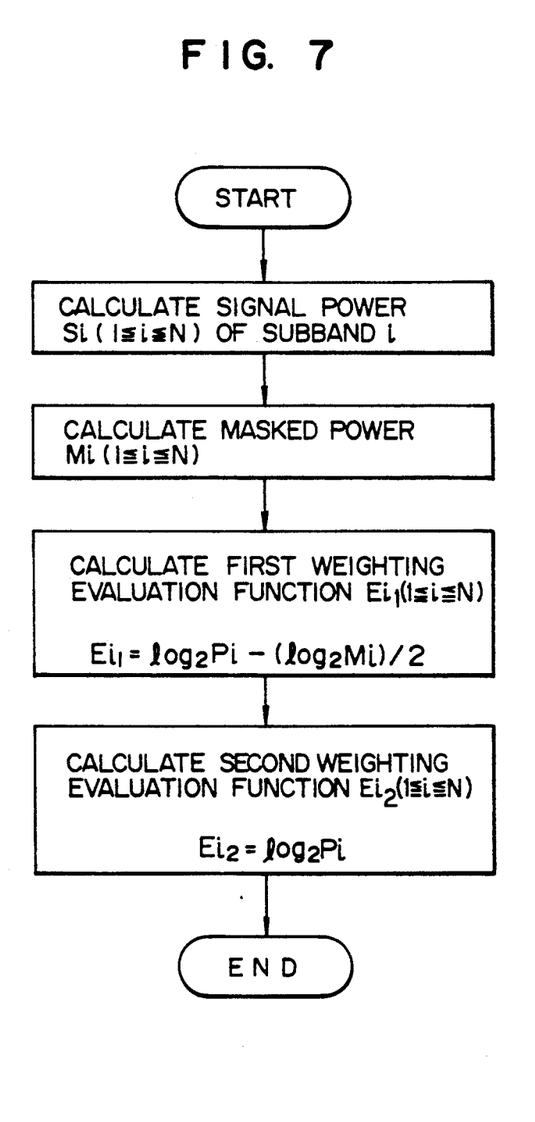
FIG. 7 is a flow chart of a weighting evaluation function calculator in a second embodiment of the present invention.

The weighting evaluation function calculator 53 in the second embodiment calculates a plurality of weighting evaluation functions required for performing better bit allocation in the bit allocation decision unit 54 by combining the noise-to-mask ratio criterion representing the auditory masking effect with the noise-to-signal ratio criterion representing the signal waveform distortion. FIG. 7 is a flow chart of the weighting evaluation function calculator 53 in the second embodiment. In the weighting evaluation function calculator 53, signal power $S_i$ of a subband No. i is first calculated by using the signal of each subband supplied from the analysis filter 51. On the basis of the signal power of each subband and the masking rule, masked power $M_i$, which is masked by the signal in the subband itself and the signal in adjacent subbands and hence which is not audible to human ears, is then calculated. A weighting evaluation function $E_{i1}$ having a first weighting coefficient $W_{i1}$ ($1 \leq i \leq N$) is then calculated for every subband. In the second embodiment, all of the first weighting coefficients $W_{i1}$ are set at 1 to maximize the contribution of the noise-to-mask ratio to bit allocation. Therefore, $E_{i1}$ is calculated by the following equation.

$$E_{i1} = \log_2 P_i - (\log_2 M_i)/2$$

That is to say, the weighting evaluation function $E_{i1}$ is derived by subtracting half of the logarithm of the masked power to the base 2 from the logarithm of the peak information $P_i$ supplied from the peak information decision unit 52 to the base 2. A weighting evaluation function $E_{i2}$ having a second weighting coefficient $W_{i2}$ ($1 \leq i \leq N$) is then calculated for every subband. In the second embodiment, all of the second weighting coefficients $W_{i2}$ are set at 0 to maximize the contribution of the noise-to-signal ratio to bit allocation. $E_{i2}$ is calculated by the following equation.

$$E_{i2} = \log_2 P_i$$

That is to say, the second weighting evaluation function $E_{i2}$ is derived by calculating the logarithm of the peak information $P_i$ supplied from the peak information decision unit 52 to the base 2. The weighting evaluation function calculator 53 outputs the first weighting evaluation function $E_{i1}$ and the second weighting evaluation function $E_{i2}$ derived as heretofore described to the bit allocation decision unit 54.

Figure 8:
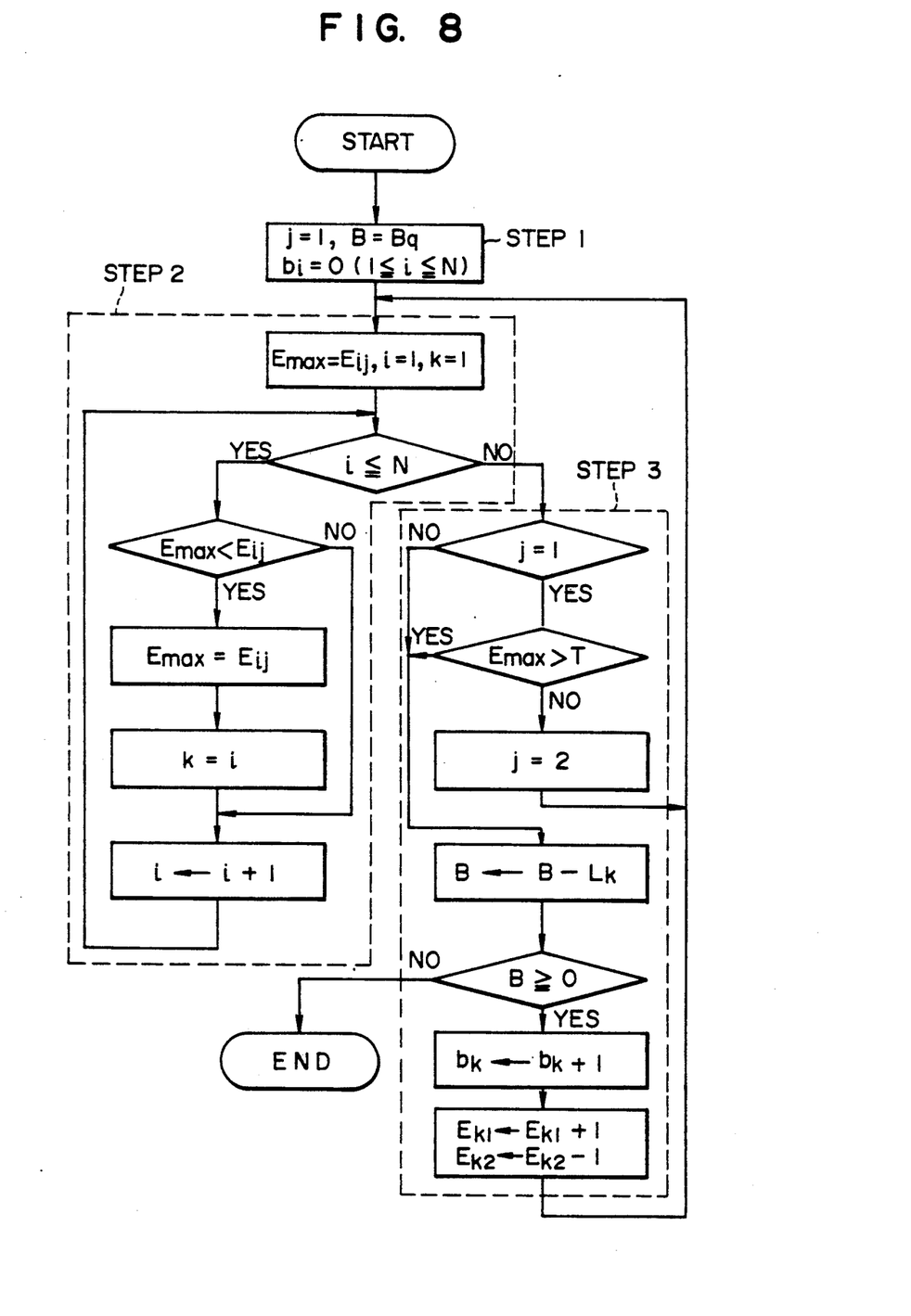
FIG. 8 is a flow chart of a bit allocation decision unit in the second embodiment of the present invention.

FIG. 8 is a flow chart of the bit allocation decision unit 54 in the second embodiment. The bit allocation decision unit 54 performs initialization processing at step 1 and thereafter repeats steps 2 and 3 by using the weighting evaluation function. Thereby the bit allocation decision unit 54 decides on and outputs the number $b_i$ of bits allocated to the quantization of the subband No. i.

At step 1, j is set at 1 and the first weighting evaluation function $E_{01}$ is selected. The number B of remaining allocatable bits is set at $B_q$ and $b_i$ ($1 \leq i \leq N$) is set at 0.

At step 2, the subband No. k which maximizes the weighting evaluation function $E_{ij}$ is found.

At step 3, the maximum value $E_{max}$ of the weighting evaluation function found at the step 2 is compared with a threshold value T when j is 1. If $E_{max}$ is less than or equal to the threshold value, j is set at 2 and processing returns to the step 2. When j is not 1 or the maximum value $E_{max}$ of the weighting evaluation function is greater than the threshold value T, $L_k$ is subtracted from the number B of remaining allocatable bits. If B is greater than or equal to 0, then the number $b_k$ of bits allocated to this subband is increased by one, one is subtracted from the two weighting evaluation functions $E_{k1}$ and $E_{k2}$, and thereafter the processing returns to the step 2. If B is negative, then the bit allocation processing is finished, and the number $b_i$ of bits at the time of finish is outputted as bit allocation information.

The weighting evaluation function calculator 53 and the bit allocation decision unit 54 can be formed by a microprocessor in the same way a the first embodiment.

In the second embodiment as heretofore described, the weighting evaluation function calculator having a plurality of weighting coefficients and a bit allocation decision unit are provided and a plurality of evaluation functions are switched to be used on the basis of $E_{max}$ of the first weighting evaluation function representing the noise-to-mask ratio. According to the state of the number of bits allocated until then, therefore, the quality of sound can be efficiently improved. That is to say, when the number of allocated bits is small and the noise-to-mask ratio is great, bits are allocated on the basis of the noise-to-mask ratio because use of the masking effect brings about a greater auditory improvement effect of the quality of sound. When the number of allocated bits becomes large and the noise-to-mask ratio becomes less than a predetermined threshold value, bits are allocated on the basis of the noise-to-signal ratio by making great account of reproducibility of signal waveform. Thereby, bit allocation, in which the influence of the error at the time of application of the auditory masking rule is lessened, is performed. As a result, it becomes possible to improve the quality, especially the transparency, of audio signals.

Alternatively, in the first and second embodiments, the bit rate may be made variable. In this case, the weighting coefficient or the threshold is set according to the bit rate.

In the first and second embodiments, subband signals supplied from the analysis filter as described in the paper 2 are used to calculate the masked power. Alternatively, however, the masked power may be calculated by using output of an analyzer having a high frequency-resolution such as an FFT analyzer with the object of application of the masking rule with a higher precision.

We claim:

1. An audio signal subband encoder comprising:
    an analysis filter for dividing an audio signal into a plurality of subbands and dividing a signal of each subband into frames, each frame having a predetermined time;
    a peak information decision unit for (i) deciding a peak from absolute values of a signal in said frames for every subband, (ii) quantizing said peak and (iii) outputting said quantized peak as peak information;
    a weighting evaluation function calculator for calculating and outputting a weighting evaluation function by subtracting a product of a logarithm of a square root of a masked power of each subband and a weighting coefficient from a logarithm of said peak information supplied from said peak information decision unit for every subband, wherein said masked power of a subband is a raised hearing threshold resulting from a masking effect caused by the hearing threshold in quiet in addition to signals in the subband itself and adjacent subbands;
    a bit allocation decision unit for deciding a number of bits to be allocated to each subband by using the weighting evaluation function supplied from said weighting evaluation function calculator and for outputting bit allocation information; and
    a quantizer for quantizing the subband signal supplied from said analysis filter on the basis of the peak information supplied from said peak information decision unit and the bit allocation information supplied from said bit allocation decision unit and for outputting sample information for every subband.

2. An audio signal subband encoder according to claim 1, wherein said weighting evaluation function calculator sets a weighting coefficient for every subband.

3. An audio signal subband encoder according to claim 2, wherein said weighting evaluation function calculator sets a weighting coefficient for every subband on the basis of aliasing distortion characteristics of subband filters and auditory masking characteristics.

4. An audio signal subband encoder comprising:
an analysis filter for dividing an audio signal into a plurality of subbands and dividing a signal of each subband into frames, each frame having a predetermined time;
a peak information decision unit for (i) deciding a peak from absolute values of a signal in said frames for every subband, (ii) quantizing said peak and (iii) outputting said quantized peak as peak information;
a weighting evaluation function calculator for calculating and outputting a plurality of weighting evaluation functions by subtracting a product of a logarithm of a square root of a masked power of each subband and a plurality of weighting coefficients from a logarithm of said peak information supplied from said peak information decision unit for every subband, wherein masked power of a subband is a raised hearing threshold resulting from a masking effect caused by a hearing threshold in quiet in addition to signals in the subband itself and adjacent subbands;
a bit allocation decision unit for deciding a number of bits to be allocated to each subband by selectively using said plural weighting evaluation functions in response to a number of bits already allocated and for outputting bit allocation information; and
a quantizer for quantizing the subband signal supplied from said analysis filter on the basis of said peak information supplied from said peak information decision unit and said bit allocation information supplied from said bit allocation decision unit and for outputting sample information for every subband.

5. An audio signal subband encoder according to claim 4, wherein said bit allocation decision unit uses said plurality of weighting evaluation functions on the basis of a quantization noise-to-mask ratio for the number of bits already allocated.

6. An audio signal subband encoder according to claim 5, wherein said bit allocation decision unit selects a weighting evaluation function having a weighting coefficient approximately equal to 1 when said quantization noise-to-mask ratio for the number of bits already allocated is greater than a threshold value and selects a weighting evaluation function having a weighting coefficient approximately equal to 0 when said quantization noise-to-mask ratio for the number of bits already allocated is less than said threshold value.

7. An audio signal subband encoder according to claim 5, wherein said weighting evaluation function calculator sets a weighting coefficient every subband.

8. An audio signal subband encoder according to claim 4, wherein said weighting evaluation function calculator sets a weighting coefficient every subband.

9. An audio signal subband encoder comprising:
means for dividing an audio signal into a plurality of subbands and dividing a signal of each subband into frames, each frame having a predetermined time;
means for (i) deciding a peak from absolute values of a signal in said frames for every subband, (ii) quantizing said peak, and (iii) outputting said quantized peak as peak information;
means for calculating a weighting evaluation function by subtracting a product of a logarithm of a square root of a masked power of each subband and a weighting coefficient from a logarithm of said peak information for every subband, wherein said masked power of a subband is a raised hearing threshold resulting from a masking effect caused by the hearing threshold in quiet in addition to signals in the subband itself and adjacent subbands;
means for deciding a number of bits to be allocated to each subband by using the weighting evaluation function and outputting bit allocation information; and
means for quantizing the subband signal on the basis of said peak information and said bit allocation information and outputting sample information for every subband.

10. A method of audio signal subband encoding, comprising:
dividing an audio signal into a plurality of subbands and dividing a signal of each subband into frames, each frame having a predetermined time;
(i) deciding a peak from absolute values of a signal in said frames for every subband, (ii) quantizing said peak, and (iii) outputting said quantized peak as peak information;
calculating a weighting evaluation function by subtracting a product of a logarithm of a square root of a masked power of each subband and a weighting coefficient from a logarithm of said peak information for every subband, wherein masked power of a subband is a raised hearing threshold resulting from a masking effect caused by the hearing threshold in quiet in addition to signals in the subband itself and adjacent subbands;
deciding a number of bits to be allocated to each subband by using the weighting evaluation function and outputting bit allocation information; and
quantizing the subband signal on the basis of said peak information and said bit allocation information and outputting sample information for every subband.

11. A method of audio signal subband encoding, comprising:
dividing an audio signal into a plurality of subbands and dividing a signal of each subband into frames, each frame having a predetermined time;
(i) deciding a peak from absolute values of a signal in said frames for every subband, (ii) quantizing said peak, and (iii) outputting said quantized peak as peak information;
calculating and outputting a plurality of weighting evaluation functions by subtracting a product of a logarithm of a square root of a masked power of each subband and a plurality of weighting coefficients from a logarithm of said peak information for every subband, wherein masked power of a subband is a raised hearing threshold resulting from a masking effect caused by the hearing threshold in quiet in addition to signals in the subband itself and adjacent subbands;
deciding a number of bits to be allocated to each subband by selectively using said plural weighting evaluation functions in response to a number of bits already allocated and outputting bit allocation information; and
quantizing the subband signal on the basis of said peak information and said bit allocation information and outputting sample information for every subband.

* * * * *